Figure 1:
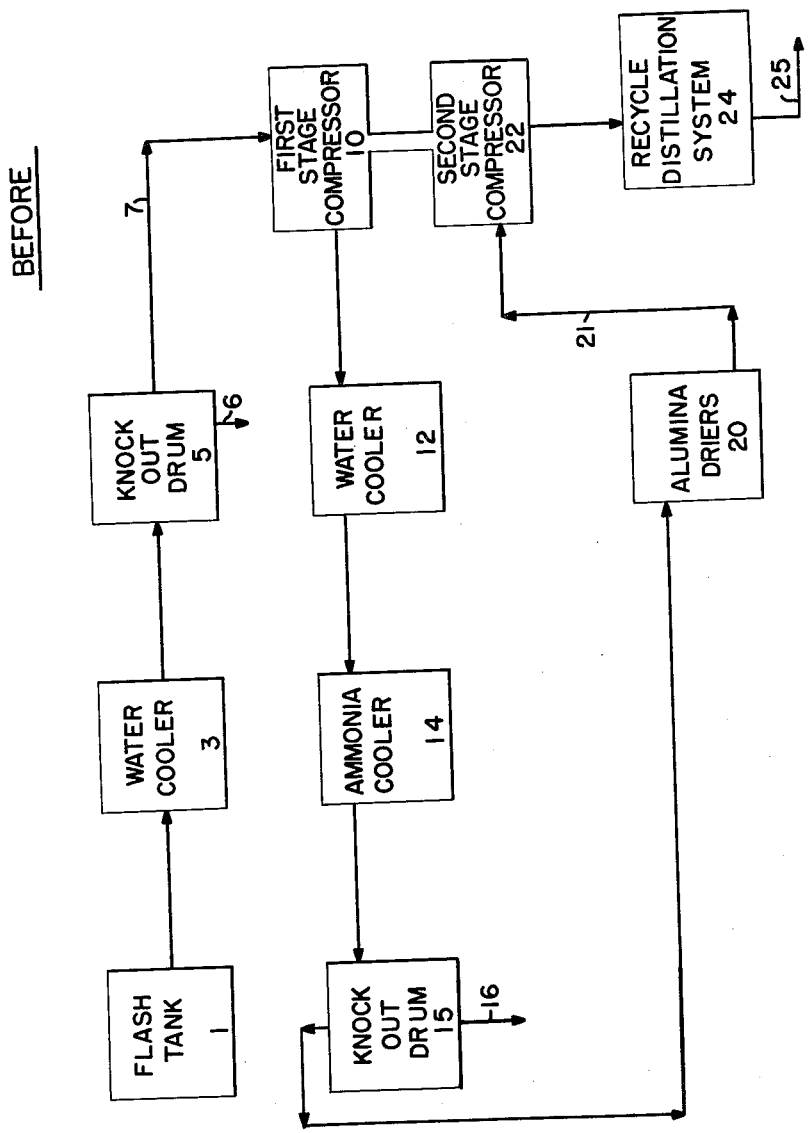

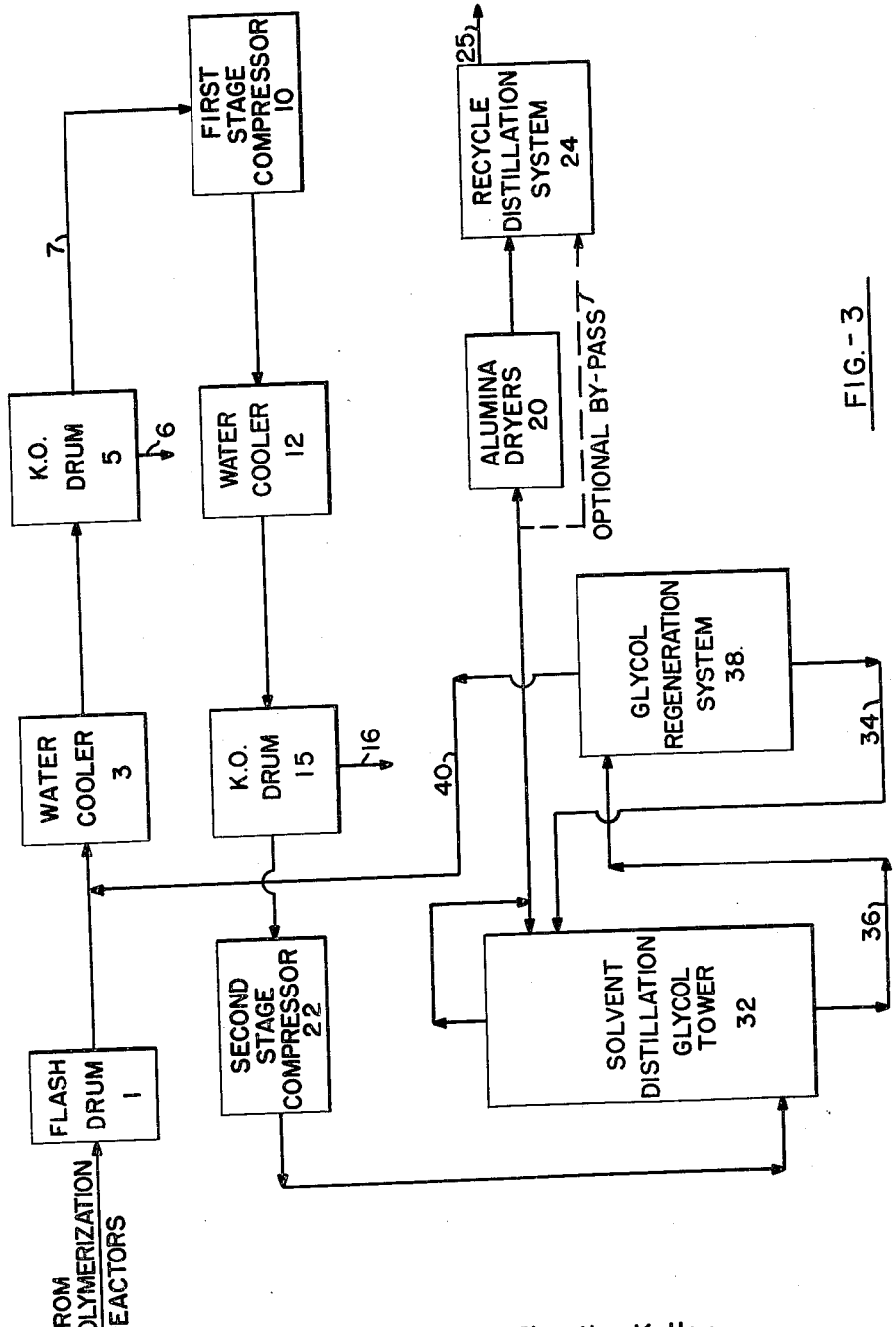

3,005,808
TREATING RECYCLE GAS

Roland Timothy Kelley and James Edward Walker, Baton Rouge, La., and Bruce R. Tegge, Madison, N.J., assignors to Esso Research and Engineering Company, a corporation of Delaware
Filed Dec. 1, 1958, Ser. No. 777,269
10 Claims. (Cl. 260—85.3)

This invention relates to an improved continuous process for preparing a rubbery polymer and more particularly to a method for treating the recycle diluent from the butyl rubber polymerization process.

It is known in the preparation of butyl rubber that a stream is formed overhead in the flash drum by vaporization of the reactor effluent overflow slurry stream. The flash gases contain the diluent methyl chloride, unreacted hydrocarbon monomers, and water vapor. In the past, this stream has been compressed, dried, fractionated, and returned to the reactor as recycle monomer and diluent. However, it has been found the alumina driers which remove the water in this stream become saturated in a relatively short time, e.g., 24 hours. Therefore, the saturated alumina drier must be frequently replaced and regenerated; but these operations are expensive and time consuming.

Furthermore, it has been noted that polymerization poisons are formed during the preparation of the rubbery polymer. These poisons are hydrolysis products of methyl chloride and water, e.g., alcohols and ethers. It should be noted that most of these poisons are produced in zones in which water is present in large concentrations. These zones are the flash tank, the first stage recycle gas compression system, and the alumina driers. Moreover, alumina is an effective catalytic agent for promoting hydrolysis. The primary hydrolytic reactions of methyl chloride and methylene dichloride are summarized in the following reactions:

$$CH_3Cl + H_2O \longrightarrow CH_3OH + HCl \qquad (1)$$

$$CH_2Cl_2 + H_2O \longrightarrow CH_2(OH)Cl + HCl$$
$$\downarrow\uparrow$$
$$CH_2O + HCl \qquad (2a)$$

$$[CH_2OHCl] + H_2O \longrightarrow [CH_2(OH)_2] + HCl \qquad (2b)$$

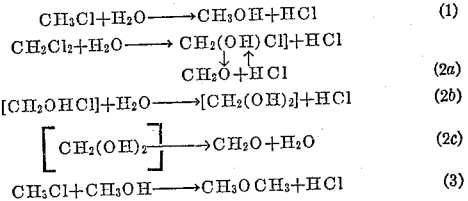

$$CH_3Cl + CH_3OH \longrightarrow CH_3OCH_3 + HCl \qquad (3)$$

Subsequent reactions of these intermediate and final hydrolytic products with methyl chloride as in reaction (3) may form the following compounds: dimethyl ether; dimethoxymethane; methyl chloromethylether; bischloromethyl ether; and dichloromethyl formal. Other types of oxygenated compounds would include tertiary butyl alcohol, and the products of the reaction of tertiary butyl alcohol and tertiary butyl chloride with methyl chloride, methylene dichloride, and the hydrolysis products of the latter two chlorides. Among these may be tertiary butyl methyl ether, ditertiary butyl formal, and tertiary butyl chloromethyl ether. These poisons described above have a deleterious effect upon the polymerization reaction by depressing the molecular weight of the polymer and by reducing catalyst efficiency.

We have discovered a method whereby the life of an alumina drier can be extended to substantially longer periods of time, e.g., five days or more. Furthermore, it is now possible to remove a considerable amount of the nefarious molecular weight poisons from the recycle monomer and diluent stream. Thus, in accordance with one embodiment of this invention, the recycle stream from the flash tank is compressed and cooled; subsequently treated with a glycol solution; and then passed through alumina driers.

Figure 2:
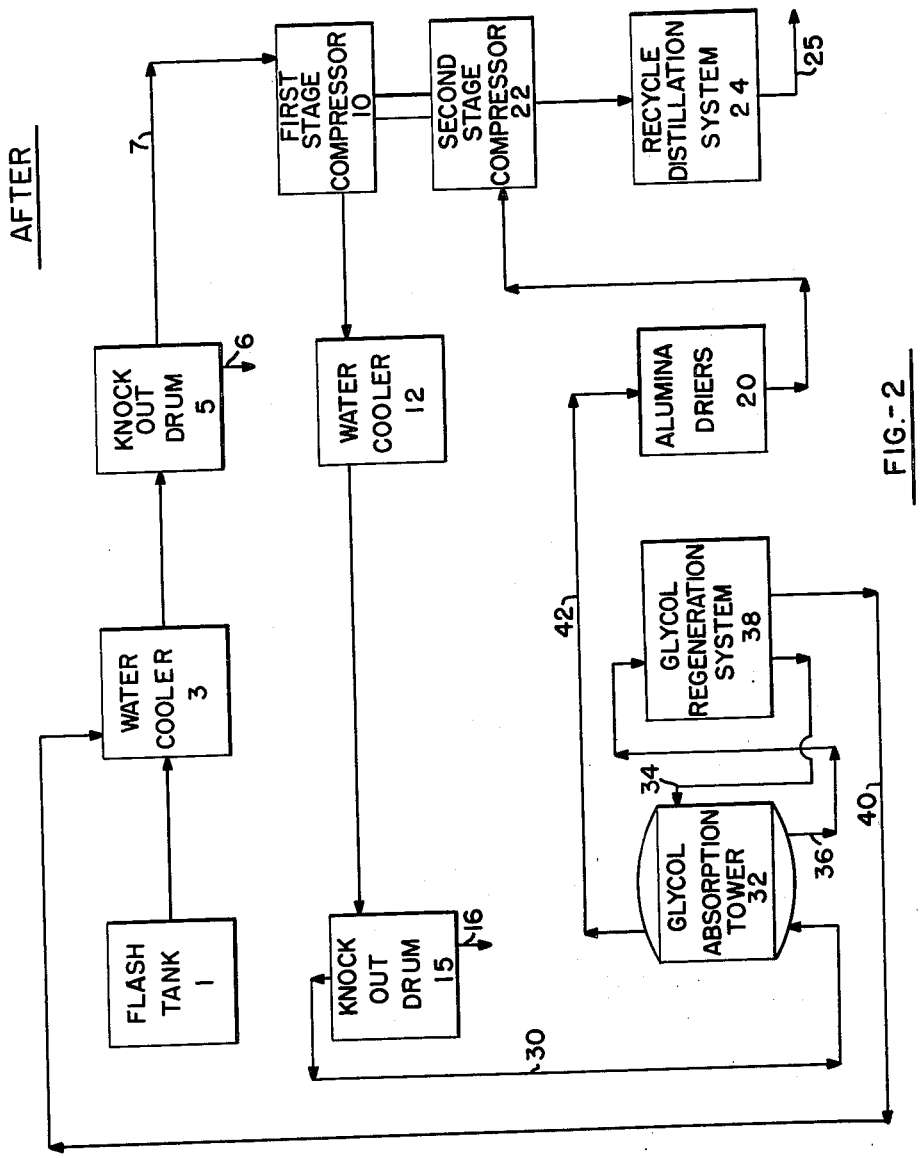

This invention may be fully understood from the following description with the accompanying drawings in which FIG. 1 shows the process previously employed, FIG. 2 demonstrates the improved process in accordance with the present invention, and FIG. 3 indicates another embodiment of this invention.

Referring now to FIG. 1, a vaporized stream comprising methyl chloride, water, unreacted hydrocarbon monomers, and polymerization poisons are withdrawn from the overhead in flash drum 1 and transported through water cooler 3 to knockout drum 5. In this drum 5, a small portion of the water in the stream is removed through line 6. From the knockout drum 5 is withdrawn a stream which comprises the same compounds with slightly less water therein and this stream is introduced by means of line 7 into the first stage of recycle gas compressor 10. After the stream is compressed, it is passed through water cooler 12 and through ammonia cooler 14 to knockout drum 15 where additional water is removed by means of line 16. The stream which still has a considerable amount of water therein, is transported to alumina driers 20 where all the water in the stream is removed. A dry stream containing trace quantities of polymerization, poison as well as the unreacted hydrocarbons and methyl chloride diluent, is withdrawn from outlet 21 and passed through the second stage of the recycle gas compressor 22 and recycle distillation system 24 to provide a stream which is eventually recycled to the polymerization reactor by means of line 25. However, in accordance with this process, the alumina driers have to be regenerated daily, and furthermore the polymerization poisons which remain in the recycle stream have a deleterious effect upon the over-all process.

Referring now to FIG. 2, in accordance with this invention, a stream comprising water, methyl chloride, unreacted hydrocarbons, and polymerization poisons from flask tank 1 is passed through water cooler 3, knockout drum 5, first stage recycle gas compressor 10, and water cooler 12 in a similar procedure to the one previously described in FIG. 1. However, the stream from cooler 12 in the present invention is passed directly into knockout drum 15; therefore, the ammonia cooler is eliminated in this process. Again, some of the water is removed from the stream in the knockout drum 15 by means of line 16; however, a considerable amount of water remains therein. Therefore, in accordance with this invention, the stream from knockout drum 15 is transported through line 30 to a glycol absorption tower 32. A glycol solution is introduced at the top of tower 32 through line 34. The function of this tower 32 is to remove most of the water from the stream and thereby lessen the burden which is placed upon the alumina driers. Furthermore, the glycol solution removes a substantial quantity of the polymerization poisons from the system. From the bottom of tower 32 is withdrawn the glycol solution with water, polymerization poisons, and some methyl chloride which has been absorbed therein; and this solution is transported by means of line 36 to glycol regeneration system 38. In this regeneration system 38, glycol is recovered and returned to the absorption tower 32 by means of line 34. However, another function of the regeneration system 38 is to recover methyl chloride which is withdrawn and transported through line 40 as recycle for water cooler 3. From the top of tower 32 is withdrawn a stream of methyl chloride and unreacted hydrocarbons which contains considerably less water and less polymerization poisons therein. This overhead stream 42 is introduced into alumina driers 20 where the small amount of water remaining is removed from the stream. It is possible to eliminate the alumina driers entirely if the glycol system is efficient enough. The dry stream is then passed through second stage compressor 22 and recycled distillation system 24 to provide a stream which can be recycled by means of line 25 to the polymerization reactor. Thus, it is now possible to remove most of the water which is produced in the preparation of butyl rubber before the recycle stream comes in contact with alumina driers. Therefore, the driers only require regeneration about once every 3 to 7 days. Furthermore, polymerization poisons are removed from the recycle stream and the catalyst efficiency is improved. Also the depressing of the molecular weight of the butyl rubber polymer has been alleviated in this invention.

The butyl rubber polymer of this invention is prepared by reacting 70 to 99.5 parts by weight, preferably 85 to 99.5, of an isoolefin with 30 to 0.5 parts by weight, preferably 15 to 0.5, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene.

Mixture of monomers, preferably with 1 to 5 volumes of inert diluent, e.g., methyl chloride, should be cooled to a temperature between 0° and −200° C., and it is preferred that the temperature range be between −60° and −130° C. The cold mixture is polymerized by the addition of a Friedel-Crafts catalyst, preferably an aluminum halide catalyst in a liquid or dissolved form, in conjunction with vigorous agitation. The amount of catalyst is generally about 0.02 to 0.5% by weight of the mixed olefins.

The polymerization reaction is rapid and the polymer precipitates out of the solution in the form of a slurry or flocculent white solid. The polymer, which is recovered in a flash tank and dried, has a Staudinger molecular weight between 30,000 and 150,000, preferably 40,000 to 60,000; and an iodine number between 0.5 and 50, preferably between 1 and 15. The preparation of this copolymer is described in U.S. Patents 2,455,665; 2,356,128; and 2,611,751 which are included herein by reference. The butyl rubber also within the scope of this invention includes those which are halogenated, e.g., chlorinated and brominated; the preferred range of halogen in the rubber structure is from 0.9 to 1.5 wt. percent for chlorinated butyl rubber and 1.5 to 3.0 wt. percent for brominated butyl rubber.

From the overhead in the flash drum is provided a stream comprising a range of 90.0 to 98.0% methyl chloride, 0.4% to 1.0% water, 1.0 to 9.0% unreacted hydrocarbons and traces of polymerization poisons. After this stream is passed through a series of coolers, knockout drums, and compressors, it is treated with a glycol solution in an absorption tower. About 3 to 10 gallons of glycol solution are provided for every pound of water entering the tower in the recycle stream and about 0.94 to 1.00 pounds of water and some of the polymerization poisons are absorbed therein.

In another embodiment of this invention shown in FIG. 3, the process vapors from knockout drum 15 are further compressed by second stage compressor 22 and then fed to the bottom of glycol absorption tower 32. Regenerated glycol 34 is fed into the absorption tower a few plates below the top of the tower. In this case the glycol tower 32 is operated as a solvent distillation tower by condensing the vapors in stream 42 and returning a portion of condensed stream 42 to the top of the glycol absorption tower as reflux. Bottom stream 36 is fed to the top of glycol regeneration tower 38. Overhead vapor stream 40 containing water and some unreacted monomers is returned to water cooler 3. Glycol bottom stream 34 now stripped of water is recycled to solvent distillation glycol tower 32. Since this absorption system operates at a higher pressure than that shown in FIG. 2, only about 1 to 2 gallons of glycol solution are required per pound of water entering the absorption tower.

Although any alkylene or polyalkylene glycols may be application to this invention, it is preferred to use an ethylene glycol, di-, or triethylene glycol. Other glycols that can be used include: propylene glycol, polypropylene glycol, trimethylene glycol, pentaglycol, butylene glycol, tetramethylene glycol, 1,3-butandiol, methylpropandiol, pentandiol, 3-methyl-1,3-butandiol, pinacol, 2-methyl-2,4-pentandiol. The solution generally has a concentration of glycol within a range of 95 to 99.8 wt. percent. It is also within the purview of this invention to replace part of the glycol with an amine. The preferred amines are mono-, di-, and trialkanol amines, but the especially preferred compounds are mono-, di-, and triethanol amines. A glycol-amine solution generally comprises 10 to 30 wt. percent of the amine and 65 to 89.5% of the glycol.

It should be noted that a glycol regeneration system can be provided for recovering the glycol from the effluent of the absorption tower. Furthermore, in this regeneration system methyl chloride can be recovered and recycled to the first water cooler which is provided after the flash tank.

The overhead effluent from the absorption tower comprises 0.03 to 0.00 wt. percent water, 1.0 to 9.0 wt. percent unreacted hydrocarbons, and 99 to 91 wt. percent methyl chloride. This overhead effluent is then sent through the alumina drier, compressor, and fractionation system to provide a recycle stream for the polymerization reactor.

The addition of the glycol absorption tower to the process removes most of the water from the system prior to drying with alumina; therefore, less frequent regeneration of the driers is required. Furthermore, the removal of some of the poisons from the recycle stream, in accordance with this invention, provides greater uniformity of catalyst solvent and polymerization diluent and thereby gives better reactor control and polymer quality. In addition thereto, the ammonia coolers can be eliminated in the present process. Therefore, this invention alleviates the serious disadvantages which were previously encountered in the process for preparing butyl rubber.

The following examples are submitted to illustrate and not to limit this invention.

*Example I*

A feed of isobutylene and isoprene was introduced into a reactor and polymerized in the presence of an aluminum chloride catalyst and methyl chloride as a diluent to provide a butyl polymer of 1.5 mol percent unsaturation. The polymer slurry formed therein was introduced into a flash tank wherein a vapor stream was withdrawn overhead comprising 95 wt. percent methyl chloride, 1.5 wt. percent water, 3.5 wt. percent unreacted hydrocarbons, and trace amounts of polymerization poisons. This stream was then passed through a series of coolers, knockout drums, and compressors and introduced into a glycol absorption tower. The stream entering this tower container 0.54 wt. percent water based on methyl chloride. A 98 wt. percent aqueous triethylene glycol solution was introduced into the tower at a rate of 5 gallons TEG/1 lb. $H_2O$. The recycle stream was contacted with the glycol solution and subsequently withdrawn from the tower. The amount of water remaining in the effluent stream was determined to be 0.18 wt. percent based on methyl chloride.

Another run was performed in which the pressure in the tower was increased from the 42.7 p.s.i.a. value previously used, to 113.2 p.s.i.a. The amount of water entering the tower was again 0.5 wt. percent. However, the amount of water remaining in the stream, after it was contacted with the triethylene glycol solution, was determined to be 0.013 wt. percent. Furthermore, in both runs, it was noted that the amount of polymerization poisons in the overhead stream from the tower, was substantially decreased.

Accordingly, therefore, this example demonstrates that incorporating a glycol absorption tower and contacting the recycle stream with a glycol solution before it is passed through the alumina driers has a beneficial effect upon the butyl rubber polymerization system. In accordance with this invention, considerably less water enters the alumina driers and therefore less expense will be involved in regeneration. Furthermore, removing some of the polymerization poisons in the system provides greater catalyst activity and uniformity and improved polymer quality.

*Example II*

In this example the flashed gases from the water slurry tank were passed through a series of coolers, knockout drums, first and second stage recycle gas compressors and introduced on the 27th tray of a 30-plate glycol dehydrating tower. The stream from the second stage recycle gas compressor entered the tower at a temperature of 270° F. and a pressure of 200 p.s.i.a. The stream consisted of 6804 lbs./hr. of methyl chloride, 710 lbs./hr. of unreacted hydrocarbons, and 44 lbs./hr. of water. A 99.8 wt. percent ethylene glycol solution was introduced to the 5th plate of the tower at a rate of 400 lbs./hr. The recycle stream was thus contacted with the glycol solution and subsequently withdrawn from the top of the tower at conditions of 140° F. and 190 p.s.i.a. The overhead vapor of 9575 lbs./hr. was condensed and 2200 lbs./hr. was returned to the top of the tower as reflux. The remaining 7250 lbs./hr. of dry recycle methyl chloride and isobutylene contained 12 p.p.m. of water and was sent to the recycle fractionation system. The bottom stream from the glycol dehydrating tower contained 44 lbs./hr. of water, 400 lbs./hr. of ethylene glycol, 204 lbs./hr. methyl chloride, and 60 lbs./hr. of $C_4$ and $C_5$ hydrocarbons. This stream was fed to the top of a glycol regeneration tower in order to remove the water, methyl chloride, and $C_4$ and $C_5$ hydrocarbons from the glycol solvent. The glycol regeneration tower contained 15 plates and was operated at a pressure of 1.5 p.s.i.a. with top and bottom temperatures of 120° F. and 300° F., respectively. The overhead stream from this tower containing 204 lbs./hr. of methyl chloride, 44 lbs./hr. of water, and 60 lbs./hr. of $C_4$ and $C_5$ hydrocarbons was returned to the water flash tank of the recycle gas system. The bottoms from the glycol regeneration tower contained 400 lbs./hr. of glycol and 0.8 lb./hr. of water. This stream was cooled from 300° F. to 140° F. before it was recycled to the 5th plate of the glycol dehydrating tower.

It will be noted that the water in the overhead recycle stream from the glycol dehydrating tower amounted to only 12 p.p.m. As a result it was not necessary to pass this stream through the alumina dryers for further water removal and the alumina dryers were by-passed.

Having described the general nature and specific embodiments of the present invention, the true scope is particularly pointed out in the appended claims.

What is claimed is:

1. An improved continuous process for preparing butyl rubber which comprises polymerizing a mixture of a major amount of $C_4$ to $C_7$ isoolefin and a minor amount of $C_4$ to $C_{10}$ conjugated diolefin, said polymerization being carried out in the presence of a Friedel-Crafts catalyst at temperatures between about $-130°$ C. and $-60°$ C. in a methyl chloride diluent so as to form a slurry of the polymerized product in said diluent together with unreacted monomers and oxygen-containing organic polymerization poisons, admixing said slurry with water of sufficiently high temperature to produce a vaporized first stream comprising water, diluent, unreacted monomers and oxygen-containing organic polymerization poisons, transporting said first stream through a series of cooling, knockout and compressing zones so as to remove gross amounts of water content therefrom, intimately contacting the resultant first stream in an absorption zone with a solution of an alkylene glycol having from 2 to 6 carbon atoms, withdrawing from said absorption zone a second raffinate stream containing less water and polymerization poisons than said first stream, drying said second stream in the presence of alumina, and fractionating said dry stream to form a recycle stream for the polymerization reaction.

2. The process according to claim 1 in which the glycol solution comprises 95 to 99.8 wt. percent of a glycol selected from the group consisting of diethylene glycol, triethylene glycol, and ethylene glycol.

3. The process according to claim 1 in which the glycol solution comprises 95 to 99.8 wt. percent of diethylene glycol.

4. The process according to claim 1 in which the glycol solution comprises 95 to 99.8 wt. percent of triethylene glycol.

5. The process according to claim 1 in which the glycol solution comprises 95 to 99.8 wt. percent of ethylene glycol.

6. The process according to claim 1 in which the glycol solution comprises 65 to 89.8 wt. percent of an alkylene glycol and 10 to 30 wt. percent of an alkanolamine.

7. The process according to claim 1 in which the glycol solution comprises 65 to 89.8 wt. percent of triethylene glycol and 10 to 30 wt. percent triethanolamine.

8. An improved continuous process for preparing butyl rubber which comprises polymerizing a mixture of a major amount of $C_4$ to $C_7$ isoolefin and a minor amount of $C_4$ to $C_{10}$ conjugated diolefin, said polymerization being carried out in the presence of a Friedel-Crafts catalyst at temperatures between about $-130°$ C. and $-60°$ C. in a methyl chloride diluent, thereby forming a slurry of the polymerized product in said diluent together with unreacted monomers and oxygen-containing organic polymerization poisons, admixing said slurry with water of sufficiently high temperature to produce a vaporized first stream comprising water, methyl chloride diluent, unreacted monomers and oxygen-containing organic polymerization poisons, transporting said first stream through a series of cooling zones, knock-out zones, first and second stage compressing zones so as to remove gross amounts of the water content therefrom, passing the resultant first stream into an extraction and solvent distillation zone wherein said stream is intimately contacted with a solution of an alkylene glycol having from 2 to 6 carbon atoms, withdrawing from the top of said absorption and solvent distillation zone a dry second raffinate stream, condensing said dry second stream, refluxing part of said condensed second stream to said absorption and solvent distillation zone, fractionating the remaining part of said condensed second steam to provide a recycle stream for the polymerization zone, withdrawing from the bottom of said absorption and solvent distillation zone a third stream containing water, methyl chloride, unreacted monomers and alkylene glycol, transporting said third stream to a regeneration zone to provide substantially pure alkylene glycol for recycle to said absorption and solvent distillation zone.

9. In the continuous process of producing butyl rubber from the polymerization of a mixture of a major amount of $C_4$ to $C_7$ isoolefin and a minor amount of $C_4$ to $C_{10}$ conjugated diolefin, said polymerization being carried out in the presence of a Friedel-Crafts catalyst at a temperature of between about $-130°$ C. and $-60°$ C. in a methyl chloride diluent so as to form a slurry of the polymerized product in said diluent, and thereafter intimately mixing said slurry with water of a temperature sufficiently high to produce a vaporized stream comprising water, methyl chloride diluent, unreacted monomers and oxygen-containing organic polymerization poisons, and transporting said stream through a series of cooling, knockout and compressing zones so as to remove gross amounts of water content therefrom; the improvement which comprises intimately contacting said vaporized resultant stream with a solution of an alkylene glycol having from 2 to 6 carbon atoms to substantially reduce the amount of water and oxygen-containing organic polymerization poisons contained therein before utilizing the resultant vaporized raffinate stream as recycle material in the polymerization process.

10. The process according to claim 9 wherein the glycol solution comprises 95 to 99.8 wt. percent of a glycol selected from the class consisting of diethylene glycol, triethylene glycol and ethylene glycol.

References Cited in the file of this patent

UNITED STATES PATENTS 2,636,025     Howe et al.     Apr. 21, 1953
2,758,988     Banes et al.     Aug. 14, 1956

OTHER REFERENCES

Lange: "Handbook of Chemistry," 1946, pages 510–511.
Palit et al.: "Ind. Eng. Chem.," vol. 38 (1946), pages 741–744.
Laddha et al.: "Ind. Eng. Chem.," vol. 40 (1948), pages 494–495.